United States Patent
Galis

(10) Patent No.: US 6,256,197 B1
(45) Date of Patent: Jul. 3, 2001

(54) RETROFIT COMPUTER COOLER

(76) Inventor: Oscar Galis, 813 Texcoco, Monte Bello, CA (US) 90640

( * ) Notice: Subject to any disclaimer, the term of this patent is extended or adjusted under 35 U.S.C. 154(b) by 0 days.

(21) Appl. No.: 09/482,358

(22) Filed: Jan. 14, 2000

(51) Int. Cl.[7] ................................................. G06F 1/20
(52) U.S. Cl. ......................... 361/687; 361/707; 361/695; 165/126
(58) Field of Search .................................. 361/687, 707, 361/704, 775, 699, 700, 695, 697; 454/184, 353; 165/80.3, 80.4, 104.33, 122–126; 62/259.2; 174/15.2, 16.3

(56) References Cited

U.S. PATENT DOCUMENTS

| | | | |
|---|---|---|---|
| 5,107,398 | * | 4/1992 | Bailey ................................... 361/687 |
| 6,118,655 | * | 9/2000 | Mecredy, III et al. .............. 361/687 |
| 6,163,453 | * | 12/2000 | Hou et al. .............................. 361/687 |

* cited by examiner

Primary Examiner—Leo P. Picard
Assistant Examiner—Hung Van Duong

(74) Attorney, Agent, or Firm—Peter Gibson

(57) ABSTRACT

An arcuate duct has an inlet continuous with a housing about a blower and an outlet perpendicular to the blower which further has a lip directing the air flow perpendicularly. The arcuate duct transforms an air flow intake along an X axis smoothly to air flow parallel a Y axis and the outlet lip directs the air flow parallel a Z axis given a horizontal disposition of the arcuate duct main body which utilized in a desktop PC. A vertical disposition is utilized in a tower type PC. In either case the blower is disposed adjacent an opening in the rear of the PC enclosure created by removing a removable panel and the arcuate main duct body is positioned between the IC cards and HDD on one side and the PC enclosure on the other side, being slightly compressed between the two to maintain positioning. Air flow through the arcuate duct is directed against the CPU and RAM. The lower portion of the blower is left open to blow air directly ahead past the IC cards against the HDD and auxiliary disk drives in front. The arcuate duct outlet is larger than the inlet minimizing back pressure and promoting laminar flow therethrough while an abrupt change of direction caused by the lip of the outlet induces turbulent flow and increased convection. Installation requires no rearrangement of components in the PC and no fixed attachment to the PC.

20 Claims, 3 Drawing Sheets

RETROFIT COMPUTER COOLER

BACKGROUND OF THE INVENTION

1. Field of the Invention

The present invention relates generally to electrical systems and devices with cooling means, more particularly to electrical systems and devices using air for cooling, and most specifically to electrical systems and devices using a fan or blower for cooling.

2. General Background

The current widespread use of computers in the home is considered to have originated with the advent of the IBM (International Business Machines) PC (Personal Computer) in the early 1980s. Subsequent to this introduction diverse companies manufactured and sold what are commonly known as IBM Compatible PCs which are characterized by use of a DOS (Disk Operating System), particularly MS (MicroSoft) DOS and Windows operating systems developed and licensed by Microsoft Corporation. The growth of this industry is considered to have been fueled by the development of faster and more powerful microprocessors such as those developed in the early 1990s by Intel Corporation and others including AMD (Advanced Micro Devices).

The more recent history of this continuing development also is allied with the more recent popularity of the Internet which was first developed by the U.S. Department of Defence and aided by the advent of internet access providers such as AOL (America On ine and internet search engines such as Netscape. This and other capabilities are not of direct concern to the present invention but are merely illustrative of the increased popularity of PCs generally which development has been characterized by the use of faster and more powerful microprocessors which support expanded capabilities for the PC which term is used hereinafter to denote a computer which uses a microprocessor as a CPU (Central Processing Unit) and which are further characterized by the use of a DOS which is inclusive of the Windows operating systems which currently dominate the PC market.

Microprocessors, which are invariably utilized as CPUs in PCs, are electronic devices as are the various solid state transistor based printed circuit boards or 'chips' or 'cards' typically found in a PC. All of these electronic and the other components of a PC except for the case or housing, known herein as a PC enclosure, including the HDD (Hard Disk Drive), 'floppy' disk drives, laser or CD (Compact Disk) drives, generate heat, particularly the A.C. (alternating current) to D.C. (direct current) electrical transformer which, in a PC, is commonly known as the power supply. The amount of heat generated or dissipated by all of these electric components is considerable. One relatively recent PC is noted as using and therefor dissipating 325 W (Watts) of power of which the CPU uses 30 W (U.S. Pat. No. 5,793,608, Abstract).

The operating temperature of the CPU of a PC is considered critical to the speed at which the entire PC operates. Hence while the removal of heat from the case enclosing the PC generally is beneficial and necessary to normal functioning of a PC it is the operating temperature of the CPU which is generally determinative of the speed at which the PC operates. As the microprocessors utilized as the CPU in a PC have become faster and more powerful the operating temperature of the same has become more important. It is stressed that the CPU, along with all the other components of a PC, are enclosed in a case and therefor the ambient temperature inside that case has been of primary concern. It is also stressed that the transformer comprising the power supply of a PC is invariably the greatest source of beat generation in a PC.

It is also noted that virtually all PCs are equipped with at least one fan or blower for cooling the inside of the enclosure provided by the casing of a PC. If only one fan or blower is utilized it is generally an exhaust fan and virtually all PCs have an exhaust fan which is hence considered a given or assumed characteristic of a PC. Additional fans or blowers have also been utilized in PCs including additional devices, i.e. retrofit devices, which may be added to a PC. Such retrofit devices are typically blowers which are adapted for disposal within the space reserved for additional disk drives.

Discussion of the Prior Art

Retrofit devices, such as those sold by Windtek, position a blower in the space typically reserved for additional disk drives and provide forced air cooling of the HDD installed in a PC in particular and intake air for the enclosure generally. The disk drives, and the space reserved for additional disk drives, are invariably located at the front of a PC. The power supply is located in the back of a PC and the CPU is located in the middle of the PC. Most importantly, perhaps, a retrofit blower fitting in the space reserved for an additional disk drive denies the use of that space for the installation of an additional disk drive. For this reason these devices are considered undesirable.

Certain devices are also known which promote air flow through the enclosure of a PC. U.S. Pat. No. 4,643,245 issued to Smoot, III et al. discloses such a device which provides a blower in an open top base upon which the PC is placed and which directs air "across a base member up through the computer thus cooling the circuit board" (Abstract). Another such device is disclosed by U.S. U.S. Pat. No. 4,702,154 issued to Dodson which uses an interior enclosure about the power supply with two blowers mounted on a forward inclined surface of the same which intakes air from inside the PC enclosure, forces this air against the power supply and other components contained in the interior enclosure, expelling the air out the back of the PC casing or enclosure.

Various baffle constructions are also known which are intended to direct the air from either an intake fan, an exhaust fan, or both, to certain components within a PC such as the power supply, CPU, particular printed circuit boards, et cetera. One example is provided by U.S. Pat. No. 5,136,456 issued to Benck et al. and assigned to IBM which uses an intake and an exhaust fan with a baffle therebetween. These constructions are characterized by air flow throughout the enclosure and are considered to provide a less than satisfactory cooling as a result. It is considered that unless air flow is directed specifically to the CPU in particular the ability to lower the operating temperature of the same with regard to the ambient temperature inside the enclosure is severely reduced. Japan Patent #3-135098 issued Oct. 6, 1991 to Miyamoto and assigned to Hitachi Ltd. uses "a guide 7a for altering the direction of the flow of the air 10 at an angle . . . to efficiently cool the board 2" (Abstract). However, the air used is that which is first passed through the power supply which, as earlier mentioned, generates the most heat of any component of a PC.

Japan Patent #6-21677 issued Jul. 7, 1994 to Suzuki and assigned to Mitsubishi Electric Corporation discloses an arrangement whereby a duct encloses the power supply and is provided at one end with an intake blower and the printed circuit board is specifically disposed outside this duct within the larger enclosure which has separate ventilation so that the two cooling systems are separated and the heat dissipated by the power supply is removed from the PC enclosure.

U.S. Pat. No. 5,422,787 issued Jun. 6, 1995 to Gourdine and assigned to Energy Innovations, Inc. discloses a "dedicated air flow" for a "heat generating electronic component" within an enclosure possessing an exhaust fan with tubing connecting an interior enclosure about the component concerned with a passive intake and a second interior partial, i.e. perforated, enclosure about the exhaust fan.

U.S. Pat. No. 5,559,673 issued Sep. 24, 1996 to Gagnon et al. discloses a system for providing "fitered air under a positive air pressure to such components in the computer, as the electrical power supply and microprocessor, as well as other components" (Abstract) whereby an exhaust fan inducts air through ducting having inlets placed proximate the components to be cooled.

U.S. Pat. No. 5,424,915 issued Jun. 13, 1995 to Katooka et al. and assigned to Sansha Electric Manufacturing Company, Ltd. discloses use of partitioning within an enclosure between two groups of electrical components, one group generating more heat than the other, the partitioning defining an air flow path induced by a blower whereby air may be circulated over one group first and the other group later, the latter group preferably being the hotter of the two.

U.S. Pat. No. 5,523,917 issued to Searby Jun. 4, 1996 and assigned to Hewlett-Packard Company discloses a "power supply cover that snaps into place inside a computer" which "houses an internal fan" which positioning combined with "the power supply cover's (sic) perforated walls direct the correct amount of air flow over the power supply board, the system board and disk drives to permit proper heat dissipation" (Abstract).

U.S. Pat. No. 5,566,377 issued Oct. 15, 1996 to Lee discloses a "heat dissipating apparatus installed in a computer . . . including an air duct system consisting of a plurality of air hoses, main air ducts, branch air ducts and air outlet tubes, a fan . . . (and) a plurality of piezoelectric membranes . . . controlled by a pulse generator to vibrate the air duct system so as to destroy a barrier of heat inside the air duct system (Abstract).

U.S. Pat. No. 5,793,608 issued Aug. 11, 1998 to Winick et al. and assigned to Sun Microsystems, Inc. discloses a 'Cooling System for Enclosed Electronic Components' utilizing a plurality of blowers, one positioned to force air against the disk drives, another positioned over the heat sink of the CPU, and two others acting as exhaust fans for the enclosure.

U.S. Pat. No. 5,912,802 issued Jun. 15, 1999 to Nelson and assigned to Intel Corporation discloses use of an extruded heat sink each attached to one of two microprocessors with an airstream generated by a blower directed at each conveyed by ducting between an intake and an exhaust to an enclosure of a computer.

U.S. Pat. No. 5,917,698 issued Jun. 29, 1999 to Viallet and assigned to Hewlett-Packard Company discloses a 'Computer Unit Having Duct-Mounted Fan' wherein "the duct comprises a portion shaped to define a cradle for receiving and supporting the fan, the fan being retained in the cradle by a resilient strap" (Abstract).

U.S. Pat. No. 5,959,836 issued to Bhatia and assigned to Intel Corporation discloses an 'Airflow Heat Exchanger for a Portable Computing Device and Docking Station' utilizing a duct internal to a "docking station" through which air is inducted by an exhaust fan in the same which duct further possesses an intake mating with a duct outlet in a portable or what is commonly known as a laptop computer.

Statement of Need

The review of the prior art above considered pertinent to the present invention, and the fact that these reference are only a selection from a much larger number of U.S. and other Patents concerned with cooling of computers with air flow, is considered to provide ample evidence of the submission that this field has experienced a considerable amount of development and that this development is further characterized by a comparatively recent acceleration in growth. This evidence in support of this submission is further considered to support the earlier submission that the relatively recent growth in the popularity of PCs is due in large part to the ever increasing speed and power possessed of microprocessors utilized as CPUs in PCs which underscores the contention also made earlier that the operating temperature of a CPU in a PC is critical to the performance of the PC which contention is further supported by the observation that a microprocessor is inherently compact and the faster and more powerful the microprocessor the more is urgent the need for cooling the same.

A broad distinction is recognized between retrofit and built in computer cooling systems. Retrofit cooling fans currently on the market, besides occupying the space intended for an additional 'add-on' drive, commonly known as a bay, additionally only claim the capability of decreasing the temperature of the single component specifically addressed, typically the HDD, by ten degrees Fahrenheit. Another retrofit computer cooling system, discussed above, provides a fan blowing air against the base of the computer. This is considered to provide a temperature decrease of obviously limited capability.

The other known retrofit computer cooling system also discussed above utilizes a secondary interior enclosure about the power supply and other components and intakes air from within the PC enclosure and blows it against the power supply and the other components contained within this secondary interior enclosure prior exhaust to the exterior of the PC enclosure. This approach is also considered to possess certain severe if less obvious limitations.

The air within the PC enclosure is assumed to be warmer than the air outside the PC enclosure for one. The secondary enclosure requires attachment within the PC housing for two and, as explained in this patent, a rearrangement of components within the PC is further necessary for three. These are considered major impediments to implementation. Lastly, there is no specific provision for cooling of the CPU which is not among the components readily contained by a rearrangement of components for disposition within this secondary interior enclosure.

The other references cited herein and discussed above are not retrofit devices and are accordingly assigned secondary consideration. This much larger number of references demonstrates a wide variety of arranging exhaust, intake, exhaust and intake fans including the use of ducting in a few to provide cooling of specific components, typically the power supply and typically by use of an exhaust fan. Gagnon et al., for example, uses ducting with intakes positioned proximate specific electric components of a computer and an exhaust fan to induct air into the ducting. Lee blows ambient air from outside the PC enclosure directly onto specific components in a computer but does so through comparatively narrow tubing possessing branches and requiring a plurality of piezoelectric membranes in order to "destroy a barrier of heat inside the duct system". Nelson is the only known disclosure utilizing relatively unconstricted ducting to direct air flow provided from an intake fan directly to a microprocessor, two serially disposed microprocessors actually, with regard to the air flow, without provision for cooling any other components. The ducting utilized, moreover, is simply of rectangular box construction of uniform cross section.

A need is therefore considered to exist for a retrofit computer cooling system which may be readily installed in a PC enclosure without rearrangement of the components therein which provides an effective lowering of the operating temperature of the CPU by recognizing basic thermodyamic and aerodynamic principles regarding the cross sectional configuration of the ducting employed to direct the air flow generated by an intake blower.

SUMMARY OF THE INVENTION

Objects of the Invention

The encompassing object of the principles relating to the present invention is the provision of a retrofit cooling system for a PC.

A first primary object of the principles relating to the present invention is a retrofit cooling system for the provision of a PC which effectively lowers the operating temperature of the CPU.

A first auxiliary objective of the first primary object of the principles relating to the present invention is the provision of a retrofit cooling system for a PC which directs air flow against the CPU.

A second auxiliary objective of the first primary object of the principles relating to the present invention is the provision of a retrofit cooling system for a PC which directs air flow provided by an intake fan against the CPU.

A third auxiliary objective of the first primary object of the principles relating to the present invention is the provision of a retrofit cooling system for a PC which directs air flow past the power supply.

A second primary object of the principles relating to the present invention is the provision of a retrofit cooling system for a PC which is easily installed inside a PC enclosure.

A first auxiliary objective of the second primary object of the principles relating to the present invention is the provision of a retrofit cooling system for a PC which is easily installed inside a PC enclosure without rearrangement of any PC components.

A second auiliary objective of the second primary object of the principles relating to the present invention is the provision of a retrofit cooling system for a PC which is easily installed inside a PC enclosure without means of attachment to the PC enclosure.

A third auxiliary objective of the second primary object of the principles relating to the present invention is the provision of a retrofit cooling system for a PC which is easily installed inside a PC enclosure without means of attachment to any structure or component within the PC housing.

A third primary object of the principles relating to the present invention is the provision of a retrofit cooling system for a PC which effectively lowers the temperature of all the electronic components of a PC.

A first auxiliary objective of the third primary object of the principles relating to the present invention is the provision of a retrofit cooling system for a PC which directs air flow from an intake fan against all the electronic components of a PC.

A second auxiliary objective of the third primary object of the principles relating to the present invention is the provision of a retrofit cooling system for a PC which effectively lowers the ambient temperature inside a PC enclosure.

A fourth primary object of the principles relating to the present invention is the provision of a retrofit cooling system for a PC which does not occupy space inside a PC enclosure reserved for additional components.

A first auxiliary objective of the fourth primary object of the principles relating to the present invention is the provision of a retrofit cooling system for a PC which does not occupy a drive bay.

A second auxiliary objective of the fourth primary object of the principles relating to the present invention is the provision of a retrofit cooling system for a PC which does not occupy a card slot.

Ancillary objectives of the principles relating to the present invention include the provision of a retrofit cooling system for a PC which is:
(a) made of a material which inhibits the creation of static electricity;
(b) easily manufactured;
(c) inexpensively manufactured;
(d) durable;
(e) reliable;
(f) relatively quiet.

Other objectives, advantages, and benefits of and derived from the principles relating to the present invention may become apparent with a reading of the Summary below and with a reading of the Detailed Description further below, especially if made with reference to the drawings attached hereto and briefly described below.

Principles Relating to the Present Invention

The objects and objectives expressed above are achieved with a blower mounted to the intake end of a duct possessing a configuration characterized by a plurality of different aspects:
(a) an inlet possessing a cross sectional area adjacent to the blower;
(b) an inlet possessing a cross sectional area preferably adjacent to an upper portion of the blower;
(c) a hollow main body which is substantially flat;
(d) a hollow main body which preferably possesses a substantially uniform height;
(e) a hollow main body which preferably possesses a height of less than two inches;
(f) a hollow main body which is longitudinally arcuate;
(g) a hollow main body which possesses thin walls;
(h) a hollow main body which preferably possesses longitudinal corrugation;
(i) a hollow main body which is preferably molded;
(j) a hollow main body which is preferably molded from polystyrene sheet;
(k) an outlet which possesses a substantial angle with respect to the inlet;
(l) an outlet which preferably possesses a substantially perpendicular angle to the inlet;
(m) an outlet directing the air flow at an angie with respect to the main body of the duct;
(n) an outlet possessing a cross sectional area at least as great as the cross sectional area of the intake;
(o) an outlet possessing a cross sectional area preferably greater than the cross sectional area of the intake.

The above listed characteristics define a structure which can be readily positioned inside a PC such that the blower is substantially flush to a removable panel in the rear wall of a PC and the duct is positioned on top of many components inside the PC with the outlet of the duct directing the air flow produced by said blower directly downward against the CPU and other electronic components on the main board or floor of the PC. This air flow is lastly exhausted by the exhaust fan of the PC behind the power supply.

The shape of the duct of an embodiment in accordance with the principles relating to the present invention minimizes back pressure and maximizes the volumetric air flow produced by the blower. The lower portion of the blower preferably is open, positioned below the duct and blows air directly past the HDD and the electronic 'cards' against the other disk drives in the PC. Installation of an embodiment in accordance with the principles relating to the present invention requires no rearrangement of any component in the PC and no attachment to any part of the PC including the PC enclosure which needs only to be removed in order to position the duct and connect the blower electrically.

NOMENCLATURE

Figure 1:
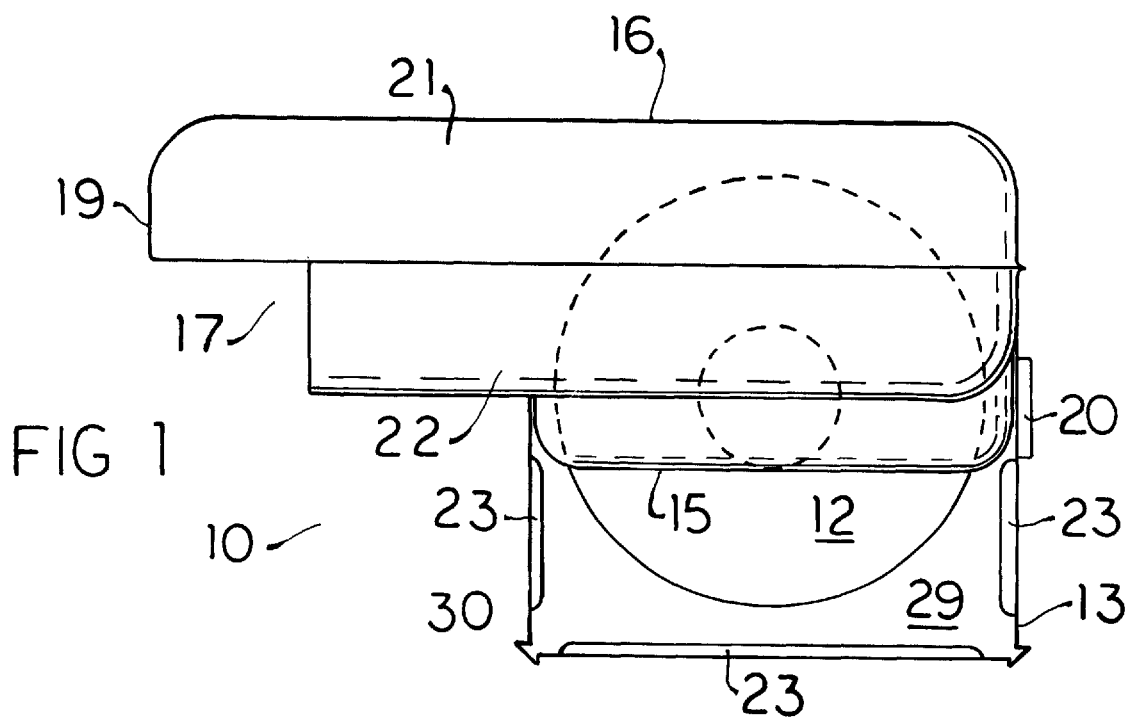
FIG. 1 is a plain elevation view taken from the back of a preferred embodiment of the principles relating to the present invention.

PC cooler
arcuate duct
blower
blower housing
arcuate duct inlet
arcuate duct main body
arcuate duct outlet
arcuate duct outlet lip
adhesive patch
arcuate duct upper half
arcuate duct lower half
blower housing corrugation
arcuate duct corrugation
electrical leads
blower frame
blower downwind face

DETAILED DESCRIPTION OF A PREFERRED EMBODIMENT

A PC cooler 10 comprising a preferred embodiment of the principles relating to the present invention is depicted in FIGS. 1–4 which is seen therein to consist of an arcuate duct 11, a blower 12 and a blower housing 13 disposing an arcuate duct inlet 15 adjacent to the downwind face 30 of an upper portion of the blower 12. As depicted it is preferred that this upper portion of the blower 12 disposed adjacent to the arcuate duct inlet 15 encompass approximately three quarters, i.e. about 75%, of the face of the blower 12 with the lower quarter left open to force air straight ahead.

Correctly installed in a PC with the blower disposed against the opening in the rear wall of the PC created by removing a removable panel in the rear wall this lower portion of the blower 12 is disposed directly behind the integrated circuit (IC) cards which are disposed in an upright parallel spaced apart relation to each other. In front of these cards which typically provide such functions as a modem, graphics, and video capabilities, the main, hard disk drive (HDD), is invariably located with the other soft or auxiliary disk drives including CD, i.e. laser, drives in front of these components. The lower portion of the blower 12 is left open to blow forced intake air directly ahead through the cards and past the HDD and against the other disk drives in front, thereby cooling the cards and the drives.

Other key components in the PC including first and foremost the microprocessor(s) comprising the CPU but also including the RAM (random access memory) and other IC chips are addressed by the air flow generated by the upper, preferably larger, portion of the blower 12. These electronic components are invariably located in the middle of a PC, below the cards, HDD, and disk drives in the case of a tower type PC, next to or adjacent those components in the case of a desktop type PC. A PC cooler 10 in accordance with the principles relating to the present invention is accordingly either installed in a substantially vertical disposition in a tower or horizontally in a desktop. The dimensions will vary according to these two cases as well but the functioning is the same in either case.

In both cases the blower 12 is located at the rear of the PC adjacent the opening created by removing a removable panel which is essentially in line with the HDD, cards, and auxiliary disk drives and the arcuate duct inlet encompasses what is called herein the upper portion of the blower 12 although this will actually be the left hand side of the blower 12 in the vertical disposition used in a tower taken from the front of the PC while this is the upper portion of the blower 12 in the horizontal disposition utilized for a desktop installation. Installation in either case has the arcuate main body 16 of the PC cooler 10 extending forward from the rearwardly disposed blower 12 between either the top interior surface of the PC casing or enclosure in the case of a desktop, or the right hand sidewall in the case of the tower, and the cards and HDD, which are below the arcuate main duct body 16 in the case of the desktop, or on the inside in the case of the tower.

In either case the main arcuate duct body 16 is essentially pressed into place with the cards and HDD contacting the arcuate duct lower half 22 and the PC enclosure contacting what is known as the arcuate duct upper half 21 which is descriptive of the desktop orientation. What is termed the arcuate duct lower half 22, for the sake of convenience in terminology, actually is the inside or interior side in a tower installation, and the arcuate duct upper half 21 becomes the outside or sidewall side in a tower installation. In either case the PC cooler 10 is held in the correct disposition by compression between the cards and HDD contacting the arcuate duct lower half 22 and the PC enclosure contacting the arcuate duct upper half 21.

For this reason, which enables installation without fastening or any true attachment to any portion of the PC, the arcuate main duct body 16 possesses relatively thin walls which permit compression sufficient for positioning. Arcuate duct corrugation 25, as clearly seen on the arcuate duct lower half 22 in FIGS. 2 & 4 but also preferably used in the arcuate duct upper half 21, provides stiffening sufficient to prevent a collapse of the arcuate duct main body 16.

The arcuate duct outlet 17, as readily seen in FIGS. 1–4, possesses a substantial angle with respect to the blower 12 which is preferably about ninety degrees in a preferred embodiment as depicted. And, clearly seen in FIG. 4, the arcuate duct upper half 21 extends past the arcuate duct lower half 22 at the arcuate duct outlet 17 and terminates in an arcuate duct outlet lip 19 which directs the air flow downward. The air flow generated by the upper portion of the blower 12 encompassed by the arcuate duct inlet 15 is hence directed first through the substantial, preferably perpendicular, angle possessed by the arcuate duct main body 16 and is secondly directed at the arcuate duct outlet 17 at a substantial angle, again preferably perpendicular, by the arcuate duct outlet lip 19.

The first angle is gradually obtained and substantially co-planar with an axis normal to the blower 12. The second angle is comparatively abrupt and is essentially normal to the plane normal an axis normal to the downwind face 30 of the blower 12. If the axis of the blower 12 is taken as the X axis of a standard cartesian coordinate system the air flow is first co-linear with that axis and is gradually brought to substantial co-linearity with the Y axis by the arcuate duct main body 16, using the nominally horizontal disposition of the arcuate duct main body 16, and then assumes a basic Z axis direction at the arcuate duct outlet 17. The gradual change in direction through the arcuate duct main body 16 maintains laminar flow and the abrupt change in direction of that air flow effected at the arcuate duct outlet 17 by the arcuate duct outlet lip 19 induces turbulent flow.

Figure 3:
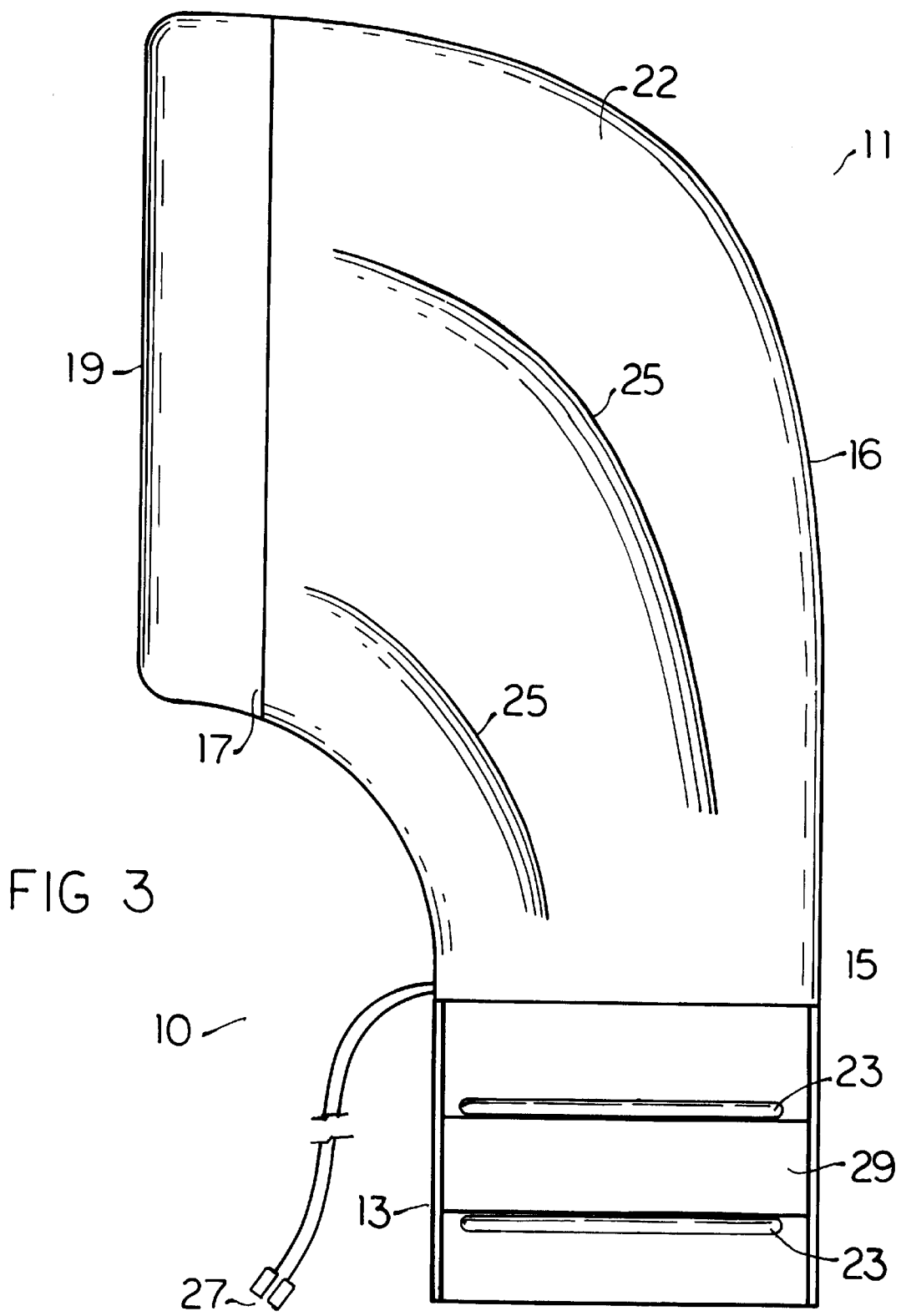
FIG. 3 is a plain elevation view taken from the bottom of a preferred embodiment of the principles relating to the present invention.

It will also be noticed, as most clearly seen in FIG. 3, that the arcuate duct main body 16 gradually increases in width from the arcuate duct inlet 15 to the arcuate duct outlet 17. This aspect, together with the laminar flow induced by the gradual change in direction effected therethrough, decreases back pressure through the arcuate duct 11 which therefore maximizes volumetric air flow therethrough. The comparatively wide arcuate duct outlet 17 ensures that all the electronic components including the CPU of the PC are encompassed and the turbulent flow induced by the arcuate duct outlet lip 19 increases the heat convection obtained with this air flow.

Fundamental aerodynamic and thermodynamic principles are hence observed in an embodiment in accordance with the principles relating to the present invention. This is considered to be of fundamental significance to the performance obtained by a PC cooler in accordance with the principles relating to the present invention which is further considered to be far superior to previously known systems. It is also noted in this regard that the arcuate duct corrugation 25 preferably provided is curved and rounded in indenture inward with respect to the arcuate duct main body 16 which aspect further promotes smooth and unrestricted laminar flow therethrough.

Figure 4:
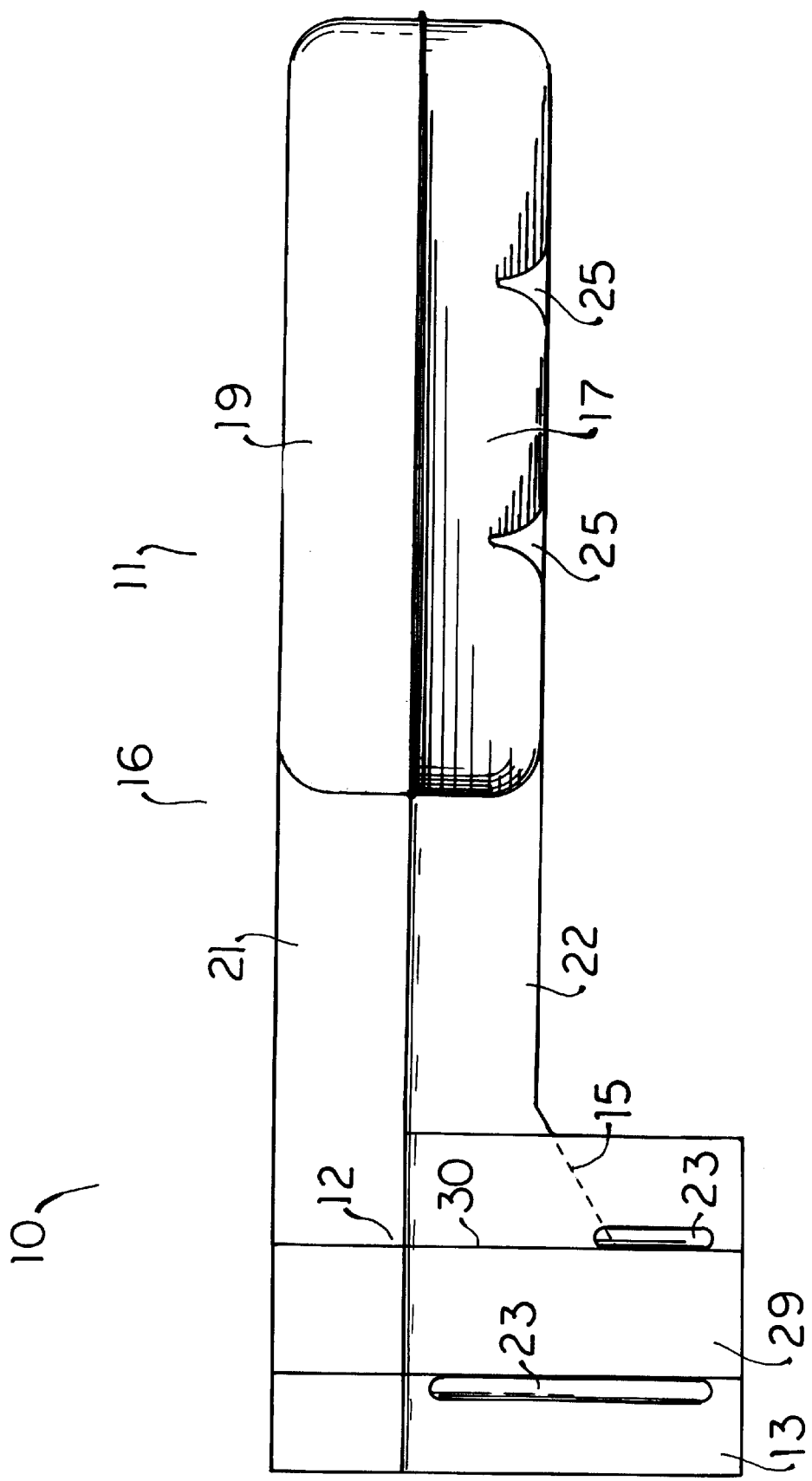
FIG. 4 is a plain elevation view taken from the interior side of a preferred embodiment of the principles relating to the present invention.

The arcuate duct inlet 15 may be seen in FIGS. 1 & 4 to possess an incline upward from the edge adjacent the downwind face 30 of the blower 12 which is necessary to obtain the substantially uniform height of the arcuate duct main body 16 which is of a lesser dimension than the upper portion of the blower 12 encompassed. This aspect comprises a restriction to air flow therethrough which is regretted for the back pressure induced thereby. It is considered, however, that the shape of the arcuate duct main body 16, for all of the reasons discussed immediately above, ameliorates this comparatively slight constriction and the slight increase in back pressure resulting therefrom. Furthermore, the corners of the arcuate duct main body 16 and the arcuate duct inlet 15 are rounded which aspect again is conducive of smooth, laminar, flow through the arcuate duct 11 which aspect minimizes back pressure and maximizes the rate of volumetric air flow therethrough for a given blower 12.

As mentioned earlier, a PC cooler 10 in accordance with the principles relating to the present invention is comprised of three basic components: the blower 12, the blower housing 13 and the arcuate duct 11. The arcuate duct 11 is further comprised, in a preferred embodiment of the principles relating to the present invention, of two halves, the arcuate duct upper half 21 and the arcuate duct lower half 22, which are bonded together. This construction is preferred for ease in manufacture as thereby enabling forming of each arcuate duct half 21,22 in a stamping operation which also obtains the desired arcuate duct corrugation 25.

Bonding of the two arcuate duct halves 21,22 together is further preferably effected with radio frequency fusing or welding which obtains an airtight seal and which is appropriate for the preferred material utilized: polystyrene sheet. This material eliminates any potential static charge and also is readily available in a substantially transparent form which is further preferred so that greater visibility during installation is obtained and so that the PC cooler 10 further does not require removal to ascertain which components inside the PC are present or absent which is considered of value in determining suitable subsequent upgrades effected by the addition or replacement of components. Other methods of construction are of course feasible such as injection molding.

The blower housing 13 is also preferably constructed of stamped polystyrene sheet and then formed with two substantially parallel perpendicular corners seen at the lower end of the same. The blower 12 is preferably disposed and maintained in the blower housing 13 with substantially parallel, spaced apart, blower housing corrugation 23 seen on the lower face and sides of the blower housing 13. This blower housing corrugation 23 is readily obtained in the stamping of the sheet material. The preferred blower housing 13 is hence a generally square U-shaped enclosure, open at front and back and open at the top where bonding to an extension of the arcuate duct upper half 21 rearward of the arcuate duct inlet 15 is preferably effected in assembly after positioning of the blower 12 therein. Bonding is preferably effected with radio frequency fusing or welding in order to obtain an air tight seal for the preferred material.

Other forms of construction may readily be devised. The preferred method of construction detailed herein for the blower housing 13 as well as for the arcuate air duct 11 is considered the most economic means of manufacture known for obtaining the characteristics desired and hence considered the best known manner of making an embodiment of the principles relating to the present invention. It is further suggested that a 12 V DC motor type blower 12 of conventional manufacture be utilized possessing appropriate electrical leads 27 of either pin or socket type.

It is preferred, actually, that both pin and socket type electrical leads 27 be provided in order to optimize the likelihood that a suitable electrical connection within the PC will be available. It is emphasized the a major attribute of an embodiment in accordance with the principles relating to the present invention is the capability of installation within a PC with a minimum of difficulty. The casing of the PC must be removed and replaced which will require the loosening and then tightening of the screws securing the PC enclosure. With the appropriate pin or socket electrical leads 27 provided for the blower 12 the installation will simply require removal of the removable panel on the rear wall of the PC enclosure, disposition of the PC cooler 10 as described above, and plugging in the electrical leads 27.

Figure 2:
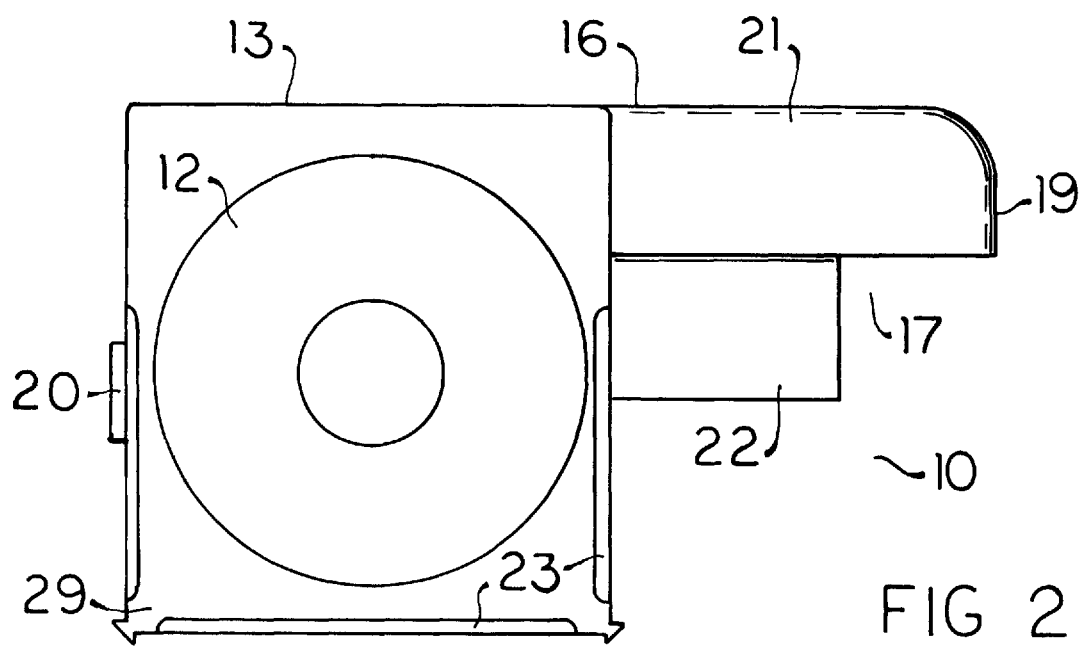
FIG. 2 is a plain elevation view taken from the front of a preferred embodiment of the principles relating to the present invention.

No rearrangement of components in the PC is required and no fixed attachment to the PC is necessary. It is recommended however, in order to ensure maintenance of the disposition of the PC cooler 10 within the PC, that a small adhesive patch 20, preferably of a hook and loop type commonly referred to as Velcro#, be disposed upon the outside sidewall in a desktop installation, which is the top face of the blower housing 13 in a tower installation, immediately adjacent the frame of the blower 12 as seen in FIGS. 1 & 2. Using a hook and loop type adhesive it is further suggested that one half, either hook or loop, be fixed to the blower housing 13 and the other half possess a removable backing covering a conventional adhesive back. A double sided adhesive foam patch 20 would also serve in a similar manner but the hook and loop adhesive will more readily permit removal and reinstallation of the PC cooler 10 which will facilitate subsequent upgrades of PC components.

It is lastly emphasized that the foregoing has been provided to enable one practiced in the art with what is considered to be the best manner of making and using an embodiment in accordance with the principles relating to the present invention and that this is not to be construed as being in any manner as restrictive of the scope of the present invention or of the rights and privileges secured by Letters Patent for which I hereby claim:

1. A retrofit computer cooling device intended for installation in a PC possessing a HDD, a CPU, RAM, and an enclosure possessing a rear wall possessing a removable panel, said retrofit computer cooling device comprising:

a blower possessing a downwind face, a blower housing, and an arcuate duct possessing an inlet, a hollow main body, and an outlet;

said blower possessing at least one pair of electrical leads and being mounted in said blower housing with said downwind face adjacent to said inlet of said arcuate duct;

said main body of said arcuate duct possessing a substantially uniform height commensurate with the distance between a HDD and an enclosure of a PC and extending forward from said downwind face of said blower substantially parallel to a plane including an axis normal to said downwind face of said blower;

said outlet of said arcuate duct possessing a cross sectional area at least as great as a cross sectional area possessed by said inlet of said arcuate duct and further possessing a large angle with respect to said inlet of said arcuate duct;

said inlet of said arcuate duct being fixed to said housing of said blower in a position adjacent to a large portion of said downwind face of said blower and said main body of said arcuate duct possessing a fixed orientation with respect to said blower whereby said outlet of said arcuate duct possesses a large angle with respect to said downwind face of said blower;

said outlet of said arcuate duct further possessing a lip directing air flow therethrough at a large angle with respect to said plane including an axis normal to said blower;

whereby disposition of said blower adjacent an opening in the rear wall of a PC created by removing a removable panel and disposition of said main body of said arcuate duct between a HDD and an enclosure of said PC and appropriate electrical connection of said electrical leads of said blower will enable intake air to be forced by said blower through said arcuate duct against a CPU and a RAM disposed in the middle of said PC.

2. A retrofit computer cooling device in accordance with claim 1 wherein a portion of said downwind face of said blower is not directly adjacent said inlet of said arcuate duct and disposition of said blower adjacent an opening in the rear wall of a PC created by removing a removable panel and disposition of said main body of said arcuate duct between a HDD and an enclosure of said PC and appropriate electrical connection of said electrical leads of said blower will enable intake air to be forced by said blower through said arcuate duct against a CPU and a RAM disposed in the middle of said PC as well as directly forward past said HDD.

3. A retrofit computer cooling device in accordance with claim 1 wherein said outlet of said arcuate duct is substantially perpendicular said inlet.

4. A retrofit computer cooling device in accordance with claim 1 wherein said lip of said outlet directs air flow therethrough at a substantially perpendicular angle with respect to said plane including an axis normal to said blower.

5. A retrofit computer cooling device in accordance with claim 1 wherein said electrical leads are of a pin conductor type.

6. A retrofit computer cooling device in accordance with claim 1 wherein said electrical leads are of a socket conductor type.

7. A retrofit computer cooling device in accordance with claim 1 wherein said electrical leads are of both a pin conductor type and a socket conductor type.

8. A retrofit computer cooling device in accordance with claim 1 wherein said housing of said blower possesses thin walls.

9. A retrofit computer cooling device in accordance with claim 1 wherein said main body of said arcuate duct possesses thin walls.

10. A retrofit computer cooling device in accordance with claim 1 further possessing a an adhesive patch attached to said housing of said blower.

11. A retrofit computer cooling device in accordance with claim 8 wherein said housing of said blower possesses a substantially U-shaped configuration resultant from the forming of sheet material.

12. A retrofit computer cooling device in accordance with claim 9 wherein said main body of said arcuate duct is comprised of an upper half and a lower half each formed from sheet material bonded together.

13. A retrofit computer cooling device in accordance with claim 9 wherein said thin walls of said main body of said arcuate duct possess corrugation.

14. A retrofit computer cooling device in accordance with claim 10 wherein said adhesive patch is of a loop and hook construction.

15. A retrofit computer cooling device in accordance with claim 11 wherein said blower housing is constructed of polystyrene sheet.

16. A retrofit computer cooling device in accordance with claim 11 wherein said housing of said blower possesses corrugation.

17. A retrofit computer cooling device in accordance with claim 12 wherein said upper half of said arcuate duct extends rearward of said inlet and is bonded to said housing of said blower.

18. A retrofit computer cooling device in accordance with claim 13 wherein said corrugation of said thin walls of said main body is arcuate.

19. A retrofit computer cooling device in accordance with claim 13 wherein said sheet material is polystyrene.

20. A retrofit computer cooling device in accordance with claim 16 wherein said corrugation of said housing of said blower is comprised of pairs spaced apart in parallel in order to facilitate disposition of a frame of said blower therebetween.

* * * * *